March 31, 1964 V. H. ZANE ET AL 3,126,900
SPRAY-TUBE DISHWASHER

Filed May 28, 1962 6 Sheets-Sheet 2

INVENTOR.
VICTOR H. ZANE AND
ARNOLD R. KAYS,
BY Yungblut, Melville,
Strasser & Foster
ATTORNEYS.

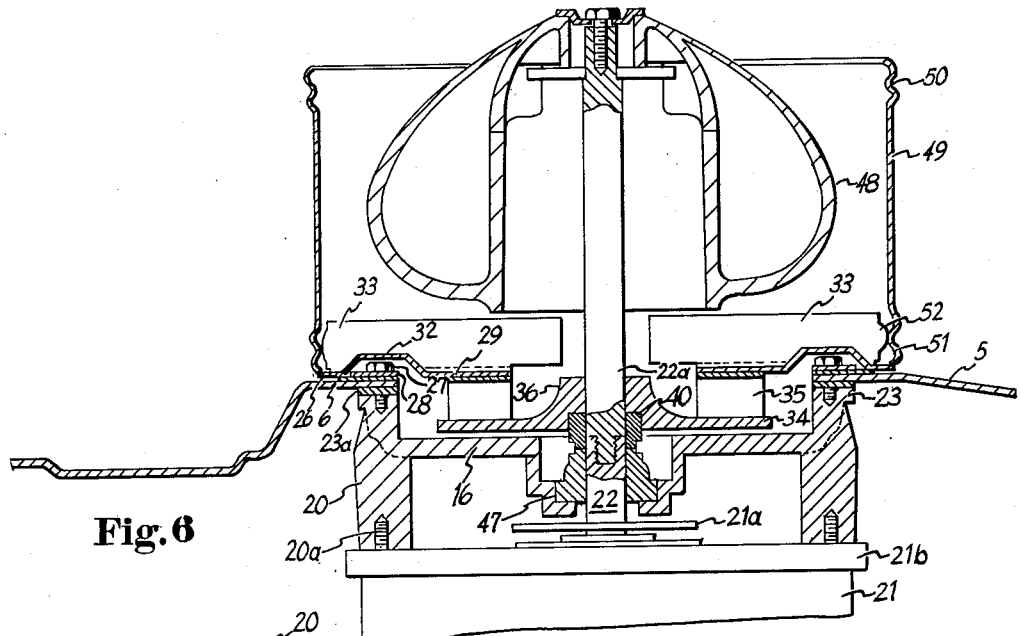
Fig. 6
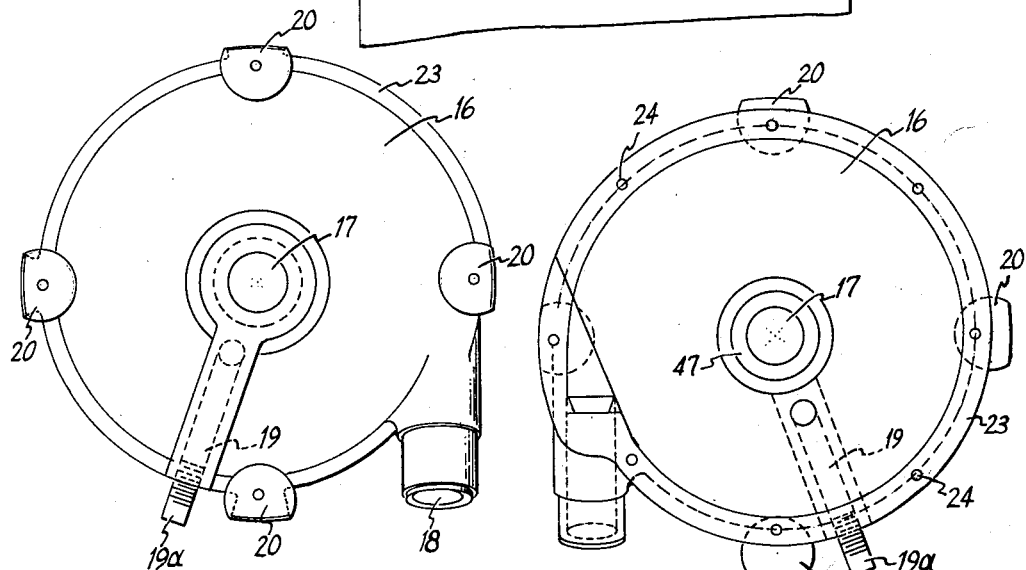
Fig. 7
Fig. 8

INVENTOR.
VICTOR H. ZANE AND
ARNOLD R. KAYS,
BY Youngblut, Melville,
Strasser & Foster.

ATTORNEYS.

March 31, 1964  V. H. ZANE ET AL  3,126,900
SPRAY-TUBE DISHWASHER
Filed May 28, 1962  6 Sheets-Sheet 5

INVENTOR.
VICTOR H. ZANE AND
ARNOLD R. KAYS,
BY
ATTORNEYS.

March 31, 1964  V. H. ZANE ET AL  3,126,900
SPRAY-TUBE DISHWASHER

Filed May 28, 1962  6 Sheets-Sheet 6

INVENTOR.
VICTOR H. ZANE AND
ARNOLD R. KAYS
BY
ATTORNEYS

United States Patent Office 3,126,900
Patented Mar. 31, 1964

3,126,900
SPRAY-TUBE DISHWASHER
Victor H. Zane and Arnold R. Kays, Connersville, Ind., assignors to Design and Manufacturing Corporation, Connersville, Ind., a corporation of Indiana
Filed May 28, 1962, Ser. No. 198,095
2 Claims. (Cl. 134—148)

The invention relates to a dishwashing machine, and more particularly to an automatic dishwashing machine with a spray-tube liquid circulating device.

It is the usual practice, in the manufacture of automatic dishwashing machines to provide such machines with an interior rack structure for support of tableware during the cleaning process. Frequently these rack structures are in two or more parts and provide several tableware receiving platforms in superposed levels. This enables a considerable quantity of tableware to be cleaned at one time.

However, such rack structures present a problem in that it is difficult to insure the proper circulation of cleaning and rinsing liquid over all of the tableware on the various rack levels. It is, therefore, a primary object of the present invention to provide a dishwashing machine with a more thorough cleaning action, and provided with means whereby an adequate circulation of cleansing and rinsing liquid over all of the tableware is insured.

It is an object of the invention to provide a dishwashing machine with better utilization of a rotary rack structure.

It is an object of the invention to provide such a dishwashing machine in which it is easier to load and unload the tableware.

It is an object of the invention to improve the cleansing action by filtration of the recirculated cleansing fluid.

It is an object of the invention to provide a dishwashing machine, that through the use of the combination of features herein disclosed, operates at a reduced noise level.

It is a further object of the invention to provide a dishwashing machine with the above and other advantages in the form of a simplified apparatus of lower manufacturing cost.

These and other objects of the invention which will be described hereinafter or will be obvious to one skilled in the art upon reading these specifications, are accomplished by that structure and arrangement of parts of which an exemplary embodiment will now be described. For purposes of an exemplary showing, the dishwashing machine of the present invention is illustrated as a top loading machine with a rotary rack similar to the one described in the copending application of Burke, Serial No. 15,310, now Patent Number 3,035,706, filed March 16, 1960, and entitled Rack Structures for Dishwashing Machines. The use of a rotary rack mounted upon a lower rack does not, however, constitute a limitation on the invention. Reference is made to the accompanying drawings wherein:

FIG. 6 is a partial sectional elevation of the lower portion of the washing machine showing the motor, pump and impeller assembly.

FIG. 7 is a bottom view of the pump housing.

FIG. 8 is a view of the pump housing as seen from above.

Briefly, the exemplary dishwashing machine of this invention comprises a vat or tub with inwardly sloping walls at its bottom, impeller means and heating means are mounted in the bottom of the vat. A lower dish rack is located in the vat above the impeller means. An upper dish rack is rotatively mounted above or on the lower rack. Pump means are provided for circulating water from the bottom of the vat through a spray tube located between the upper and lower rack members. A motor mounted beneath the vat drives both the vat impeller and the circulating pump. Modifications may be made in the exemplary embodiment as later indicated.

Figure 1:
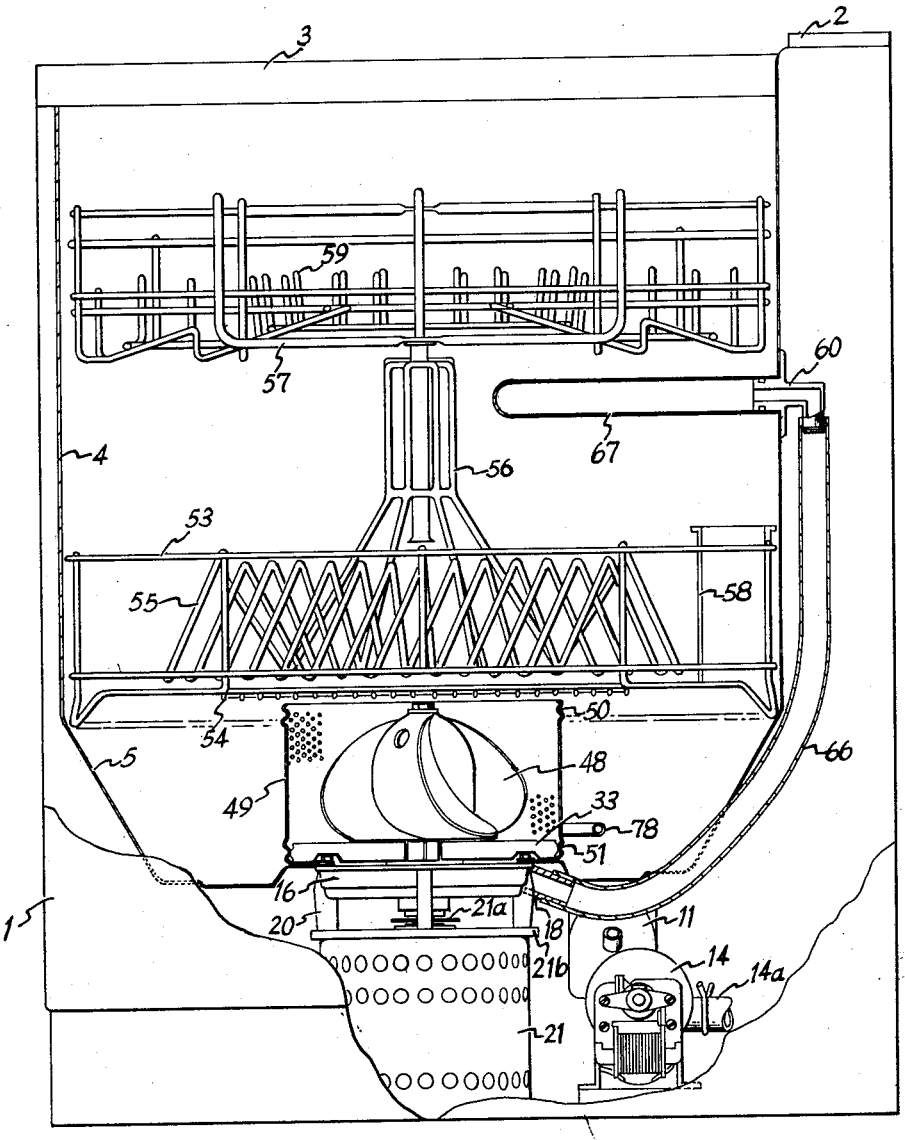
FIG. 1 is a partial sectional view of the dishwasher of this invention.

Referring to FIG. 1, the dishwashing machine is shown as having an outer casing 1 with a section 2 for housing the usual electrical controls and devices for starting and stopping the machine, governing the various cycles, and operations, which electrical controls and devices are not shown and do not form a part of the present invention, but will be familiar to one skilled in the art. For purposes of an exemplary showing the machine is illustrated as having a lid 3 for access to the vat; but it will be understood that the present invention is applicable to both top loading and front loading dishwashing machines.

Figure 2:
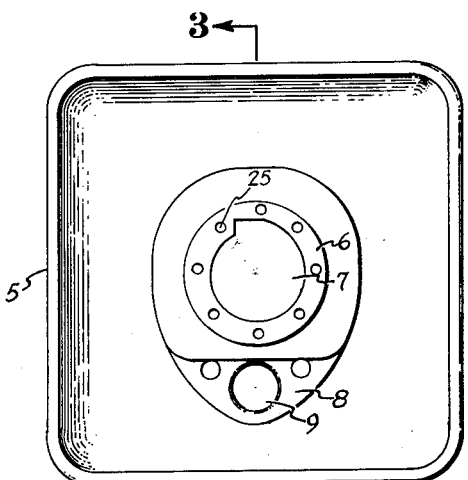
FIG. 2 is a plan view of the bottom panel of the tub or vat assembly.
Figure 3:
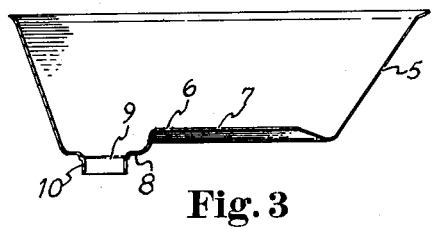
FIG. 3 is a cross sectional view taken along the section line 3—3 of FIG. 2.

The vat or tub, generally indicated at 4, may be of rectangular cross section with a structure 5 welded to the sides of the vat and forming the bottom thereof. The structure 5 is illustrated in FIGS. 2 and 3. It has side portions slanting inwardly and downwardly. The center of the structure has an annular raised portion 6 with a perforation 7, both of which are described more fully hereinafter. The lowest portion of the structure 5 constitutes a flat area indicated at 8 and containing a perforation or outlet 9. An extension or neck 10 is affixed to the outside of the structure 5 at the perforation 9 by any suitable watertight means such as welding.

Figure 4:
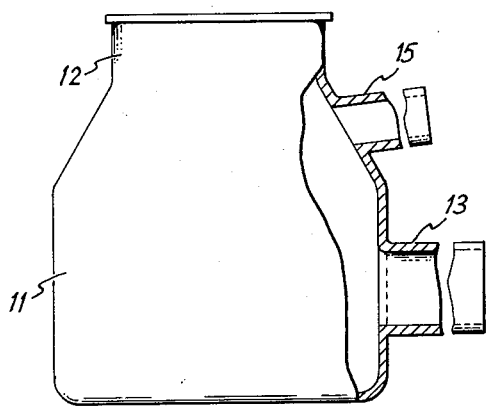
FIG. 4 is an elevational view, with a part in section, of the cylindrical drain reservoir.
Figure 5:
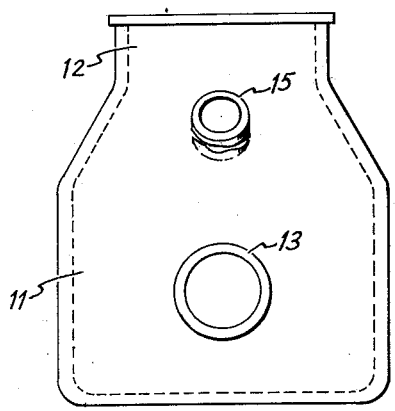
FIG. 5 is another elevational view of the drain reservoir as seen from the right side of FIG. 4.

A drain reservoir 11 is illustrated in FIGS. 4 and 5. This drain is made of any suitable material such as natural or synthetic rubber, metal or the like, and is provided with a neck 12. The neck 12 is adapted to receive the extension 10 on the bottom structure 5; and the drain is thereby connected to the perforation or outlet 9 in a watertight fashion.

The reservoir 11 is provided with an integral outlet 13 which is connected by suitable hose means to a pump 14 (FIG. 1) which communicates with a household drain (not shown) through outlet tube 14a. The reservoir 11 also has an integral inlet 15, which by suitable hose means is connected to the integrally cast bleedline 19 as shown in FIGS. 7 and 8, the function of which is described hereinafter. The pump 14 is used to withdraw water and washing solutions from the vat, and is timer controlled.

For purposes hereinafter set forth, a second or circulating pump is used with the apparatus. FIGS. 7 and 8 illustrate the housing for this pump, generally indicated at 16. The pump housing has a volute dish-like configuration with a central perforation 17 for receipt of a motor shaft. At its outer edge the pump housing 16 is provided with an outlet 18 tangentially oriented wth respect to the housing and angled downwardly from the bottom of the housing. The outlet 18 will be more fully described hereinafter. The housing 16 is also provided with an integrally cast bleedline 19 to drain water from the housing into the integral inlet 15 in the drain reservoir during the pump-out operation so as to avoid noisy operation of the pump during the drying phase of the dishwashing machine cycle. For connection purposes, a nipple 19a, FIGS. 7 and 8, is threaded into the bleedline 19. Four integrally cast downwardly depending lugs 20 are located at the outer periphery of the pump housing 16 and are spaced 90° from each other.

An electric motor, generally indicated at 21 (FIGS. 1, 6 and 10) is mounted on the lugs 20 by threading mounting bolts 20a into tapped holes in lugs 20 (see FIG. 6). Its shaft 22 extends through the perforation 17 in the pump housing.

The upper edge of the pump housing 16 comprises a flage 23 extending circumferentially about the housing and having a series of eight threaded holes 24 spaced thereabout. An annular gasket 23a, having matching holes, is located on the flange 23. The elevated portion 6 of the tub bottom structure 5 (FIG. 2) contains a matching series of eight perforations 25. FIG. 6 illustrates how the pump housing and motor assembly are affixed to the bottom structure 5. Four screws 27 with suitable washer means 28 extend through holes 25 in the bottom structure 5 through holes in the pump gasket 23a, and are threaded into the holes 24 in the flange 23 of the pump housing. The pump housing and motor assembly are thereby firmly affixed to the vat bottom structure.

Figure 12:
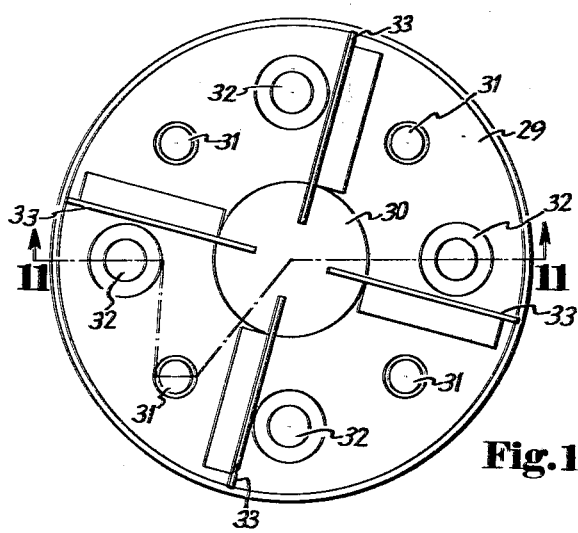
FIG. 12 is a plan view of the pump cover plate showing the anti-swirl vanes.
Figure 11:
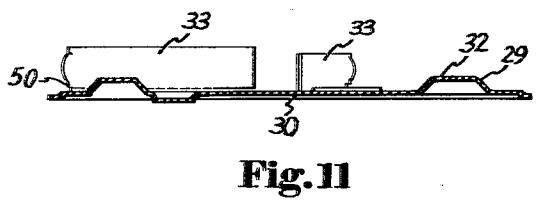
FIG. 11 is a side view of the pump cover plate with a part thereof in section, taken along the line 11—11 of FIG. 12, and showing the anti-swirl vanes.

A circular plate 29 forming the upper surface of the pump housing is illustrated in FIGS. 11 and 12. An annular plate gasket 26 placed between the surface of the vat bottom structure and the circular plate 29 has a series of four perforations and four clearance cutouts matching the perforations 24 and 25. The plate 29 is provided with a centrally located perforation 30 and a series of four holes 31 which, when the plate is in its proper position on the vat bottom structure will be coaxial with the holes in the plate gasket, the remaining perforations 25 in the surface 6, and the remaining holes 24 in the flange 23 of the pump housing. The clearance cutouts in the plate gasket 26 match the screw heads 27 used to hold the pump housing to the tub bottom. The plate 29 is also provided with a series of four circular raised portions 32 which, as will be evident from FIG. 6, will overlie the screw and washer assemblies 27, 28 when the plate is in its proper position. Four screws (not shown) are passed through the holes 31 in the plate, the holes in the plate gasket, the holes 25 in the surface 6 of the bottom structure, and the holes in the pump gasket, and are threaded into the remaining holes 24 in the flange 23, thereby holding the plate firmly in place. It will be evident that the plate 29 may be removed without disturbing the motor and pump assembly, by removal of the four screws through the holes 31.

FIG. 12 also illustrates a series of four anti-swirl vanes 33. These vanes are provided at their bottom edges with bent over ears, and are permanently affixed to the upper surface of the plate 29 by spot welding or other suitable means.

Figure 9:
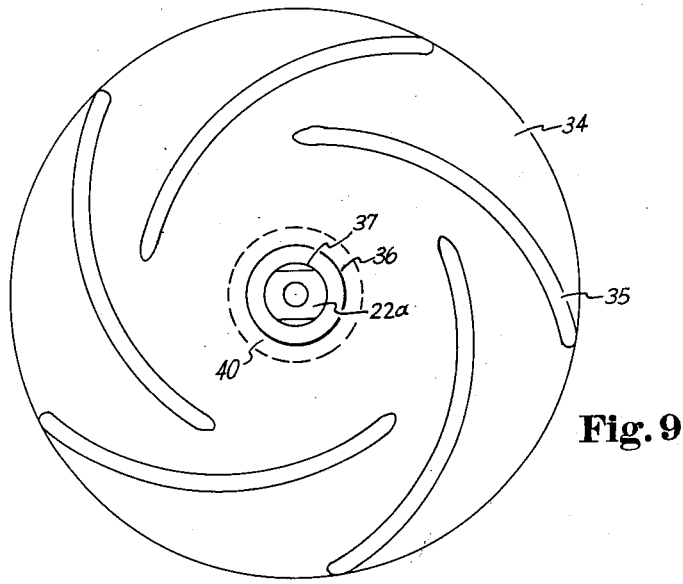
FIG. 9 is a plan view of the pump impeller.

The impeller means inside the pump housing 16 is best illustrated in FIGS. 6 and 9. The impeller 34, made of any suitable material such as metal or plastic, comprises a flat circular disc with a plurality of integral spiral vanes 35. The impeller has a raised, centrally located neck portion 36 having a perforation 37. The pump impeller 34 is mounted on its shaft 22a by any suitable means. For example, the shaft may be provided with a coarse diamond knurl and the pump impeller may be force-fitted to the shaft, or the impeller may be molded to the shaft. The impeller-shaft assembly is then joined to the motor shaft 22 by threaded engagement means as shown in FIG. 6.

Figure 13:
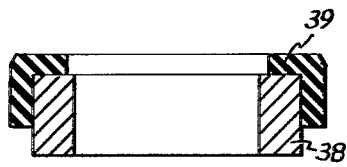
FIGS. 13 and 14 are sectional views of the two parts of the water seal for the pump.
Figure 14:
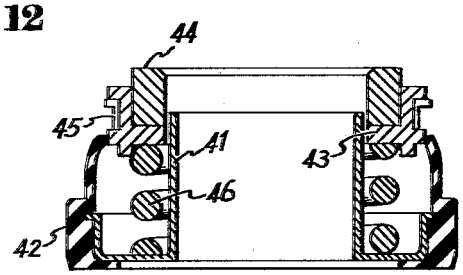

The perforation 17 in the pump housing 16 through which the motor shaft 22 extends is provided with a watertight seal most clearly illustrated in FIGS. 6, 13 and 14. The upper segment of the watertight seal is illustrated in FIG. 13. A ceramic ring 38 of generally rectangular cross section is provided with a tightly fitting rubber member 39 extending part way down its outside surface and part way across its upper edge. The ceramic ring and rubber member are affixed in a depression 40 in the bottom surface of the pump impeller 34 by a press fit.

The lower segment of the water seal is illustrated in FIG. 14, and comprises an inner housing member 41 made of any suitable material such as brass or the like, and an outer overlapping housing member 42 made of rubber or other distortable material. The upper part of the outer housing member is provided with an inwardly extending flange 43. A ring 44 of any suitable material such as carbon fits snugly between the outer housing member and the upper portion of the inner housing member 41 with its bottom surface resting on the flange 43, its upper surface extending above the outer housing member. A band 45 of suitable material such as stainless steel or brass encircles the upper portion of the housing member 42 to hold the ring 44 in position.

Figure 10:
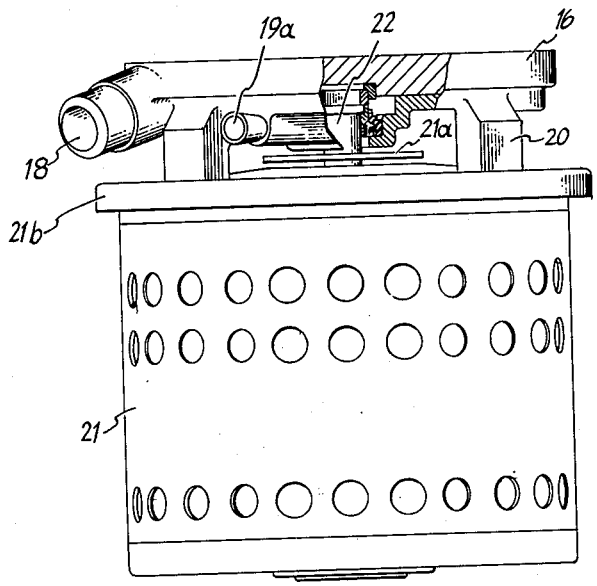
FIG. 10 is an elevational view of the motor and pump assembly with a portion thereof in section.

As shown in FIG. 14 a coil spring 46 is provided within the space between the inner housing member and the outer housing member with its lower end abutting the bottom of the inner housing member and its upper end abutting the lower surface of the flange 43 of the outer housing member. This coil spring exerts an upward extending force on the structure shown in FIG. 14. As will be seen from FIG. 6, the lower segment of the water seal is located by force fit in a central depression 47 of the pump housing 16. The two cooperating segments of the water seal permit free rotation of the joined shafts 22 and 22a while preventing the leakage of water from inside the pump housing through the perforation 17. The impeller shaft has, as above described, a water-tight press fit or molded connection with the pump impeller 34. The spring 46 insures a tight sliding fit between elements 38 and 44 which prevents the passage of water down around the motor shaft, and the outer housing 42 is as above described, in watertight engagement with the depression in the bottom of the pump housing 16. In the event leakage should occur through perforation 17 in the pump housing, an annular reinforced rubber disc 21a, FIGS. 6 and 10, through which the motor shaft 22 extends, slings the water away from the motor 21 by centrifugal action. A pan 21b, FIGS. 6 and 10, is also used for protection of the motor.

The impeller shaft 22a in the exemplary embodiment, carries a water-circulating impeller 48 within the vat of the dishwashing machine.

Referring to FIGS. 1 and 6, the vat impeller 48 and the integral pump assembly are protected by a filter screen 49. This prevents damage to the impellers by an article of tableware or other foreign solid substance inadvertently dropping into the bottom of the vat and also prevents the circulation of waste material or foreign matter by the pump as hereinafter described. The filter screen 49 comprises a foraminous cylindrical member made of any suitable material such as sheet material with reinforcing ridges formed at its top and bottom edges as at 50 and 51 in FIG. 6. The screen filter is removably mounted to the upper surface of the plate 29 and is held in place by engagement of the formed ridges at 51 in the screen over the contoured ends 52 (FIG. 6) at the outermost ends of the four anti-swirl vanes 33. This filter is so designed as to be self-cleansing. As a large portion of the liquid is in suspension during the wash or rinse cycles, the liquid level in the tub is at a low level and the lower portion of the filter screen accumulates the debris. At the conclusion of the wash or rinse phase, the main motor is shut off so that the liquid may be drained from the vat. This allows all of the liquid to fall to the bottom of the vat, raising the liquid level within the filter to a height considerably higher than that obtained during recirculation. During draining, therefore, the liquid within the filter flows in a direction opposite to that occurring during recirculation, and tends to flush away food particles resting against the outer surface of the filter.

The dish racks for holding the various articles of tableware are illustrated in FIG. 1 and may be similar to the racks shown in the copending application mentioned above. A lower rack generally indicated at 53 is supported by the vat bottom structure 5 on legs formed from wires integral with the lower rack structure. The bottom of the lower rack is partially covered with a wire screen indicated at 54 to prevent articles of tableware from falling into the impeller 48. The lower rack is provided with a plurality of division means 55 for supporting various articles of tableware in a proper position for the most efficient cleaning action. Since in the particular embodiment the lower rack has an upstanding central portion 56 on which the upper rack 57 is rotatably mounted, a foraminous cup-like member 58 is located at one side of the lower rack for holding knives, forks, spoons and similar articles. The upper rack 57 has division means 59 for holding various articles of tableware.

Figure 16:
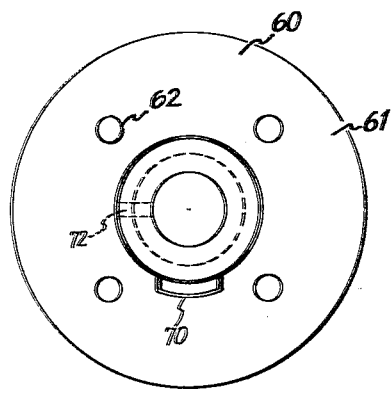
FIG. 16 is an elevational view of the connecting means as seen from the left end of FIG. 15.
Figure 15:
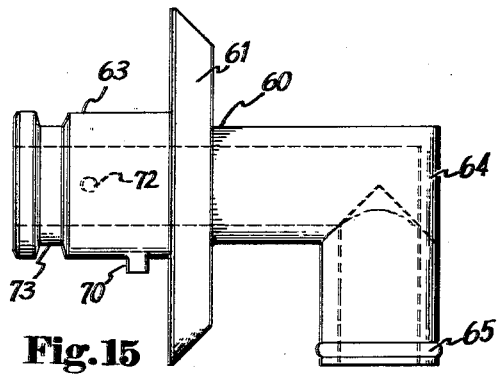
FIG. 15 is a side elevation of the connecting means between the pump hose and the spray tube.
Figure 17:
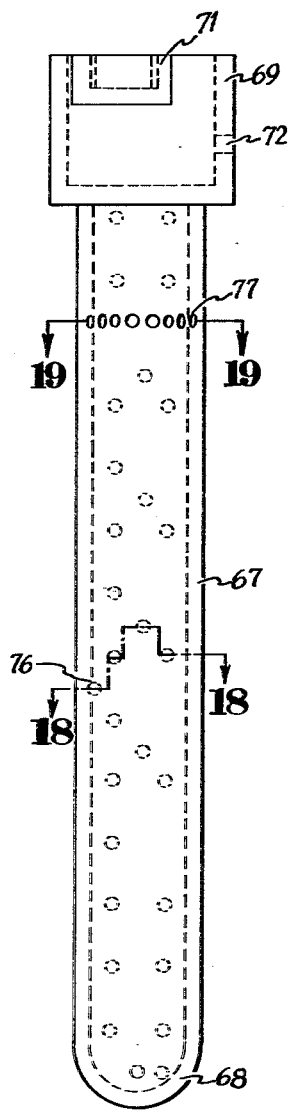
FIG. 17 is a view of the spray tube from beneath.
Figure 18:
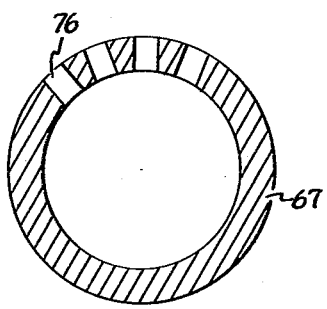
FIG. 18 is a sectional view of the spray tube showing a series of openings taken along the line 18—18 of FIG. 17.

The vat 4 is provided with a hollow fitting 60 which is indicated in FIG. 1 but is most clearly shown in FIGS. 15 and 16. It comprises a flange portion 61 provided with holes 62 so that the fitting may be bolted to the vat 4 with the interposition of a gasket between the flange and the vat wall. The fitting 60 has an internal nipple 63 which extends through a perforation in the vat wall, and an external hollow elbow portion 64 having an end configuration 65 which makes it possible to connect the fitting to the circulating pump 16 by means of a conduit 66. The conduit may be made of metal; but it may be also and more conveniently made of flexible material such as rubber or plastic. The ends of the conduit will have liquid-tight engagement with the portion 65 of the fitting and the outlet element 18 of the circulating pump.

The fitting 60 is located at a point between the upper and lower rack elements in the dishwasher. Nozzle means shown in FIGS. 1 and 17 to 19 are engaged with the inward projecting nipple 63 of the fitting. The nozzle 67 is a hollow cylindrical member closed at one end as at 68 and having at its opposite end a fitting 69 for engagement with the nipple 63. For reasons presently apparent it is desired to maintain a particular orientation between the nozzle 67 and the nipple, to which end the nipple 63 is provided with a lug 70. The fitting 69 at the end of the nozzle is provided with a recessed portion 71 in which the lug is engaged to maintain the orientation.

The mode of engagement of the nozzle with the nipple can be varied. It can be frictional, spring latched, or it can be secured by a set screw 72 as in FIGS. 15 and 17. The nipple is provided with a peripheral groove 73 into which is placed an O ring to effect a watertight seal between the nozzle and the nipple. It will be understood that with this construction the user of the dishwashing machine may disconnect and remove the nozzle when desired.

Figure 19:
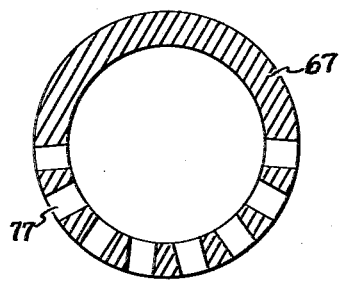
FIG. 19 is a sectional view thereof taken along the line 19—19 of FIG. 17.

The nozzle as shown in FIG. 19 has certain outlet orifices 77 on its bottom located directly above the foraminous cup 58 for the washing of the tableware therein. The upper surface of the nozzle is provided with a series of perforations 76 throughout its length directed toward the upper rack 57 at such an angle as to cause rotation of the rack. Water or washing solution is thus delivered upwardly against the underside of the rack 57 and against the tableware therein. Since the rack 57 is rotated, all portions of the tableware therein will be subjected to the jets of water or solution from the nozzle 67 although the nozzle extends less than half way across the vat.

The conventional heating element located in the bottom portion of the vat is indicated in FIG. 1 at 78.

This dishwashing machine of the present invention is capable of improved cleansing and rinsing actions by filtration and recirculation of the cleansing or rinsing fluid. As stated above, the various cycles and the controls and devices governing them do not form a part of the present invention, but it will be understood by one skilled in the art that the action of fluid in the vat will be the same whether it be cleansing or rising fluid. For example, when cleansing fluid is introduced into the vat, it will pass through the filter screen 49, and part of the fluid will be directed against the articles of tableware in the lower rack structure 53 by the impeller 48. The remainder of the fluid will pass through the perforation 30 in the plate 29 into the pump housing 16. The impeller 34 will force the fluid through the conduit 66 to the nozzle 67. As described above, the nozzle will direct jets of fluid against the upper rack 57 and the cup-like member 58. The fluid jets directed against the rack 57 cause it to rotate as described above.

The anti-swirl vanes 33 on the plate 29 tend to reduce the turbulence and swirling of the fluid as it enters through the screen 49 into contact with the impeller 48 and into the pump housing through the perforation 30 in the plate. This turbulence reduction produces an even flow of fluid to the impeller 34 resulting in a smooth, non-surging circulation of fluid at a much reduced noise-level.

Modifications may be made in the invention without departing from the spirit of it. It does not violate the spirit of the invention to mount both racks for rotation.

The invention having been described in an exemplary embodiment, what is claimed as new and desired to be secured by Letters Patent is:

1. In a dishwasher having a cabinet, a vat within said cabinet, said vat having walls and a bottom member, an access door in said cabinet to said vat, upper and lower tableware racks within said vat, at least said upper rack being pivotally mounted, and a reservoir drain and fluid discharge pump for said vat, an improved power driven washing and rinsing system comprising a pump housing affixed to the exterior of said bottom member, said bottom member having a perforation centrally located with respect to said pump housing, said pump housing having a perforation therein coaxial with said first mentioned perforation, an electric motor affixed to the bottom of said pump housing, an elongated shaft on said motor extending through said above mentioned perforations into said vat, an impeller means within said vat affixed to and driven by said motor shaft, a pump impeller affixed to said shaft within said pump housing, spray means affixed to the inside surface of one of said side walls between said upper and lower racks, a conduit connecting said pump housing to said spray means through said side wall, said spray means being horizontally oriented and extending less than half-way across said vat, said pump housing being of volute dishlike configuration, having an outlet at the outer edge of said housing tangentially oriented with respect to said housing and angled downwardly from the bottom thereof, said outlet being connected to said conduit, said housing further having an integrally cast bleed line, a means for connecting said bleed line to said reservoir drain whereby liquid is drained from said housing during the pump-out operation of the dishwasher to avoid noisy pump operation during the drying phase of the dishwashing cycle.

2. In a dishwasher having a cabinet containing a vat, said vat having side walls and a downwardly and inwardly tapering bottom part with a centrally disposed opening therein, upper and lower tableware racks mounted within said vat overlying said vat bottom part, a pump housing mounted to the under surface of said vat bottom part, said housing terminating upwardly in an opening communicating with the centrally disposed opening in said vat bottom part, a vertically disposed impeller shaft rotatably journaled in said pump housing and projecting upwardly through said openings into said vat bottom part, drive means operatively connected to the lowermost end of said impeller shaft, a vat impeller mounted on the upper end of said shaft and lying within the confines of said vat bottom part, said vat impeller acting upon rotation thereof, to propel liquid collected in the vat bottom part upwardly through said tableware racks, a pump impeller mounted on said shaft within said pump housing, said housing having an outlet opening therein positioned so that liquid entering said housing through the opening in the vat bottom part will be expelled through said outlet opening upon rotation of said pump impeller, a spray tube affixed to the inside surface of one of the vat side walls between said upper and lower tableware racks, said spray tube projecting inwardly toward the center of said vat, and a conduit connecting the outlet opening in said pump housing to said spray tube, whereby liquid from the bottom of said vat is recirculated through said spray tube, said pump housing being of a volute dish-like configuration, said outlet opening being at the periphery of said pump housing, tangentially oriented with respect thereto, and angled downwardly from the bottom surface thereof, said vat bottom part having a drain opening therein and laterally disposed with respect to said centrally disposed opening, and including a drain reservoir underlying said vat bottom part and in communication with said drain opening, said pump housing have a bleed line therein in communication with said drain reservoir whereby liquid may be drained from said pump housing.

References Cited in the file of this patent
UNITED STATES PATENTS

| | | |
|---|---|---|
| 1,780,452 | Walker | Nov. 4, 1930 |
| 1,938,302 | Snyder | Dec. 5, 1933 |
| 1,995,636 | Clark | Mar. 26, 1935 |
| 2,562,076 | Weisselberg | July 24, 1951 |
| 2,645,235 | Wheeler | July 14, 1953 |
| 2,700,978 | Pietsch | Feb. 1, 1955 |
| 2,702,558 | Blanchard | Feb. 22, 1955 |
| 2,775,975 | Andrews | Jan. 1, 1957 |
| 2,808,063 | Abresch et al. | Oct. 1, 1957 |
| 3,035,706 | Burke | May 22, 1962 |

FOREIGN PATENTS

| | | |
|---|---|---|
| 733,068 | France | Sept. 30, 1932 |